US 9,207,750 B2

(12) United States Patent
Shamanna et al.

(10) Patent No.: US 9,207,750 B2
(45) Date of Patent: Dec. 8, 2015

(54) APPARATUS AND METHOD FOR REDUCING LEAKAGE POWER OF A CIRCUIT

(71) Applicant: Intel Corporation, Santa Clara, CA (US)

(72) Inventors: Gururaj K. Shamanna, Austin, TX (US); Stefan Rusu, Sunnyvale, CA (US); Phani Kumar Kandula, Bangalore (IN); Sankalan Prasad, Bangalore (IN); Mandar R. Ranade, Bangalore (IN); Narayanan Natarajan, Bangalore (IN); Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 13/715,624

(22) Filed: Dec. 14, 2012

(65) Prior Publication Data

US 2014/0173317 A1    Jun. 19, 2014

(51) Int. Cl.
*G06F 1/32* (2006.01)

(52) U.S. Cl.
CPC ............ *G06F 1/3275* (2013.01); *G06F 1/3296* (2013.01); *Y02B 60/1228* (2013.01); *Y02B 60/1285* (2013.01)

(58) Field of Classification Search
CPC ............... G06F 1/00; G06F 1/04; G06F 1/12; G06F 1/26; G06F 1/32; G06F 11/30; G06F 15/16; Y02B 60/1228; Y02B 60/1285
See application file for complete search history.

(56) References Cited

U.S. PATENT DOCUMENTS

| 7,307,899 B2 | 12/2007 | Khellah et al. |
| 8,008,964 B1 * | 8/2011 | Cook et al. .................... 327/536 |
| 2003/0223261 A1 * | 12/2003 | Kato et al. ....................... 365/63 |
| 2004/0095825 A1 * | 5/2004 | Tanizaki et al. ................ 365/207 |
| 2007/0005999 A1 | 1/2007 | Rusu et al. |
| 2007/0043965 A1 | 2/2007 | Mandelblat et al. |
| 2007/0183185 A1 * | 8/2007 | Guo et al. ....................... 365/156 |
| 2007/0211553 A1 * | 9/2007 | Tada .............................. 365/227 |
| 2008/0136507 A1 | 6/2008 | Kim et al. |
| 2008/0151673 A1 | 6/2008 | Fallah et al. |

(Continued)

FOREIGN PATENT DOCUMENTS

WO    2014/092774 A1    6/2014

OTHER PUBLICATIONS

Office Action received for Chinese Patent Application No. 201320824119.1, mailed on Apr. 2, 2014, 1 Page of Office Action and 2 Pages of English Translation.

(Continued)

*Primary Examiner* — Thomas Lee
*Assistant Examiner* — Mohammad A Rahman
(74) *Attorney, Agent, or Firm* — Green, Howard & Mughal, LLP (57) ABSTRACT

Described is a processor comprising: a plurality of transistors operable to provide dynamically adjustable transistor size, the plurality of transistors coupled at one end to a first power supply and coupled at another end to a second power supply; a circuit coupled to the second power supply, the second power supply to provide power to the circuit; and a power control unit (PCU) to monitor the level of the first power supply, and to dynamically adjust the transistor size of the plurality of transistors so that the second power supply is adjusted to keep the circuit operational.

20 Claims, 7 Drawing Sheets

(56) References Cited

U.S. PATENT DOCUMENTS

| | | | | |
|---|---|---|---|---|
| 2008/0297234 A1* | 12/2008 | Moholt et al. | ............. | 327/541 |
| 2010/0225383 A1* | 9/2010 | Chaoui | ............. | 327/536 |
| 2011/0032000 A1* | 2/2011 | Di et al. | ............. | 326/98 |
| 2011/0252225 A1* | 10/2011 | Liu et al. | ............. | 713/2 |
| 2012/0191993 A1* | 7/2012 | Drader et al. | ............. | 713/320 |

OTHER PUBLICATIONS

Notification of Transmittal of the International Search Report and the Written Opinion of the International Searching Authority issued for International Patent Application No. PCT/US2013/045799, mailed Oct. 22, 2013, 12 pages.

Chae, Youngcheol, et al., "Low Voltage, Low Power, Inverter-Based Switched-Capacitor Delta-Sigma Modulator," *IEEE Journal of Solid-State Circuits*, vol. 44, No. 2 Feb. 2009, 15 pages.

Su, Chauchin, et al., "An Inverter Based 2-MHz 42-µW ΔΣ ADC with 20-KHz Bandwidth and 66dB Dynamic Range," *Solid-State Circuits Conference 2006*; pp. 63-66, 4 pages.

Thomas, Daniel E., "Fast Opamp-Free Delta Sigma Modulator," A Thesis, submitted to Oregon State University, presented Aug. 23, 2001; 63 pages.

Office Action issued on May 19, 2015 for Taiwan Patent Application No. 1020140493, 16 pages.

* cited by examiner

| Voltage Band 401 | Sleep Transistor Z 402 |
|---|---|
| A (e.g., 650mV to 700mV) | ZA (e.g., 1.8μm) |
| B (e.g., 701mV to 750mV) | ZB (e.g., 1.0μm) |
| C (e.g., 751mV to 800mV) | ZC (e.g., 0.4μm) |
| D (e.g., 801mV to 850mV) | ZD (e.g., 0.3μm) |
| E (e.g., 851mV to 900mV) | ZE (e.g., 0.2μm) |

400 (e.g., LUT)

APPARATUS AND METHOD FOR REDUCING LEAKAGE POWER OF A CIRCUIT

BACKGROUND

As process technologies scale (or shrink), transistor leakage increases for the same power supply level. Increase in leakage increases power consumption. As market converges to lower power consumption devices, there is a need to reduce power consumption including reducing leakage power of a device.

Conventional memory cells, for example, status random access memory (SRAM) cells have a p-type sleep transistor between a memory cell and a power grid, or a n-type sleep transistor between ground and the virtual ground of the memory cell. When a memory array (having memory cells) is not being accessed (e.g., in idle mode), the sleep transistor is enabled i.e., is turned ON. The p-type sleep transistor is usually high impedance transistor which causes the supply to the memory cell to reduce resulting in leakage reduction in the memory cell. Due to possible data retention failures at the minimum operating voltage (also called Vmin), memories are optimized to have a particular size (W/L) for the sleep transistor.

However, operating voltage of devices is becoming wider (e.g., 650 mV to Vmax), where Vmax is maximum operating voltage. Vmax is dependent on process technology node. In one example, Vmax is around 1V to 1.1V. Existing sleep schemes are inefficient at higher power supply levels because the sleep transistor size is designed for a particular operating voltage. At higher operating voltages, leakage power increases.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

The embodiments maintain the power supply to the memory cell, in sleep mode, substantially constant with reference to a retention power supply level irrespective of the processor operating voltage. The term "retention power supply level" generally refers to a power supply level below which the circuit receiving the power supply does not operate properly. For example, the retention power supply level for a memory cell is a power supply level below which the data stored in the memory cell is lost or is corrupted. In one embodiment, the apparatus causes the power supply to the memory cell to be just above the retention power supply level i.e., near the minimum operating voltage (Vmin).

The term "minimum operating voltage" (Vmin) generally refers to the power supply level below which circuits do not function properly. Generally, Vmin is equal to or slightly higher than the retention power supply level. For example, retention power supply level for a memory cell may be 550 mV and Vmin may be 550 mV or higher (e.g., 650 mV) to include guard band.

One non-limiting technical effect of keeping the power supply to the memory cell relatively constant and close to the retention power supply level during sleep mode is to ensure that leakage of the memory cell (or any other circuit) does not increase even when operating voltage varies over a wide supply range. By managing the leakage power dissipation, overall power consumption of the processor having the apparatus reduces which may increase battery life of the device (e.g., laptop, tablet, smart phone, ultra-book) having the processor.

In one embodiment, the apparatus comprises a sleep transistor coupled at one end to a first power supply (e.g., processor operating power supply) and coupled at another end to a second power supply. In one embodiment, the second power supply provides power to a memory cell (or any other circuit). In one embodiment, the sleep transistor includes a plurality of transistors operable to provide dynamically adjustable transistor size; and a PCU to monitor the level of the first power supply. In one embodiment, the PCU dynamically adjusts the transistor size (W/L) of the plurality of transistors so that second power supply is adjusted to retain data stored in the memory cell (or the other circuit).

In one embodiment, the PCU compares a level of the first power supply with information in a look-up table (LUT). In one embodiment, the LUT has information of transistor size (or control bits) for different voltage bands. In such an embodiment, the PCU determines the transistor size (or control bits for turning on/off transistors) for a specific voltage band corresponding to the first power supply level and then provides the appropriate control signals to modulate the transistor size of the sleep transistor(s). By digitally modulating the sleep transistor size to maintain the power supply level to the memory cell close to the memory cell's retention supply level, leakage power is reduced for the memory cell when operating power supply (i.e., first power supply) rises.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

The term "scaling" generally refers to converting a design (schematic and layout) from one process technology to another process technology. The terms "substantially," "close," "approximately," "near," "about," generally refer to being within +/−20% of a target value.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates a n-type transistor (e.g., NMOS, NPN BJT, etc.) and the term "MP" indicates a p-type transistor (e.g., PMOS, PNP BJT, etc.).

The term "power mode" (e.g., sleep mode, idle mode, wake-up mode, normal mode, active mode) generally refers to power states of a processor as defined by the Advanced Configuration and Power Interface (ACPI) specification (for example, Revision 5.0, published on Nov. 23, 2011) which provides an open standard for device configuration and power management by an operating system. However, the embodiments are not limited to the ACPI low power states. Other specifications that offer lower power states for a processor may be used with the embodiments.

Figure 1:
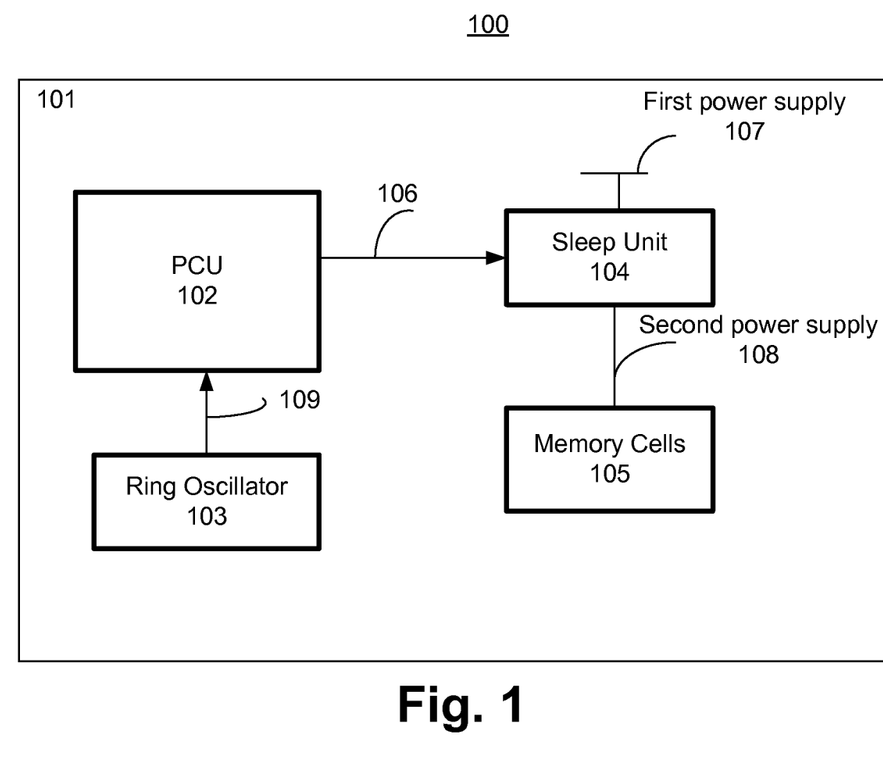
FIG. 1 is a high level block diagram of an integrated circuit or part of the integrated circuit having an apparatus to reduce leakage power of a memory cell, according to one embodiment of the disclosure.

FIG. 1 is a high level block diagram 100 of an integrated circuit 101 or part of the integrated circuit 101 having an apparatus to reduce leakage power of a memory cell, according to one embodiment of the disclosure. In one embodiment, integrated circuit 101 comprises PCU 102, ring oscillator 103, sleep unit 104, and one or more memory cells 105.

Figure 4:
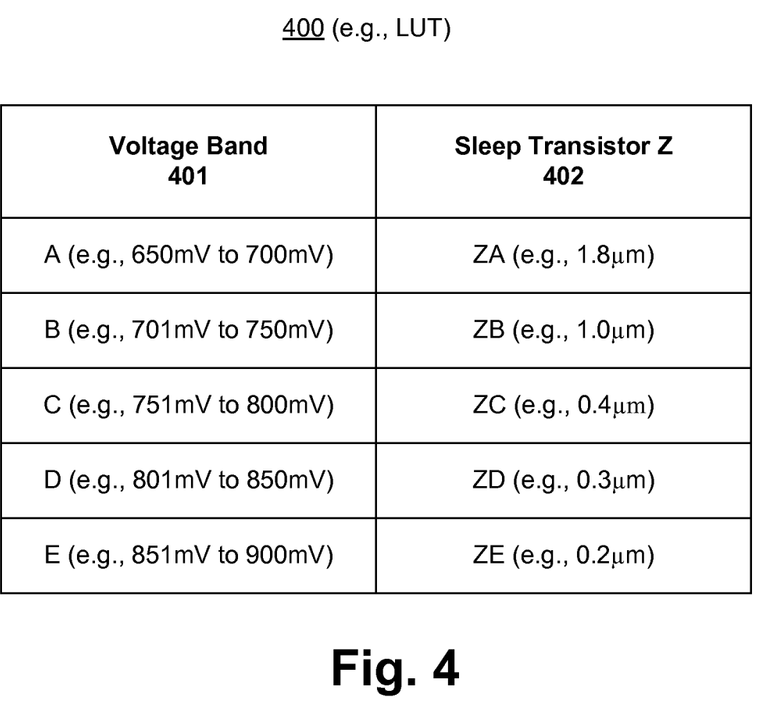
FIG. 4 is voltage band and size table to adjust sleep transistor size to reduce leakage power of the memory cell, according to one embodiment of the disclosure.

In one embodiment, PCU 102 monitors the level of first power supply 107 and compares that level with a LUT to determine the code of control signal 106. An example of a LUT is illustrated in FIG. 4. Referring back to FIG. 1, in one embodiment the code of control signal 106 determines the transistor size (W/L or simply Z) of sleep unit 104. For example, the code of control signal 106 turns on/off one or more transistors of sleep unit 104 to change the size of sleep unit 104. The term "effective size" generally refers to the area of the sleep unit 104 which is turned on.

In one embodiment, PCU 102 has access to many performance parameters of integrated circuit 101. For example, PCU 102 has access to information such as skew, temperature, voltage, clock frequency, etc. In one embodiment, PCU 102 uses this information to better calibrate the size of the sleep unit 104 which will turn on during sleep mode so that the power supplied to the circuit (e.g., memory cell) is just above the retention power supply level.

In one embodiment, sleep unit 104 comprises transistors coupled between first power supply 107 and second power supply 108. For example, the transistors are p-type transistors with their source terminals coupled to the first power supply 107 and the drain terminals coupled to the second power supply 108. In one embodiment, second power supply 108 is provided to memory cells 105. In one embodiment, memory cells 105 is a SRAM cell. In one embodiment, the SRAM cell is a 4T SRAM cell. In one embodiment, the SRAM is a 6T SRAM cell. In one embodiment, the SRAM is an 8T SRAM cell. In other embodiments, other number of transistors may be used for SRAM cells. In other embodiments, other types of memory cells may be used.

While the embodiment shows a sleep unit 104 coupled to memory cells 105, sleep unit 104 can be coupled to any circuit for which leakage power needs to be reduced during low power mode. For example, in one embodiment the circuit may be a power-gating device, a latch, a flip-flop, etc.

In one embodiment, PCU 102 monitors the frequency of a ring oscillator 103. In one embodiment, ring oscillator 103 operates on first power supply 107. In one embodiment, the oscillating frequency of ring oscillator 103 is indicated by signal 109. The frequency of the ring oscillator 103 may indicate the process skew of the integrated circuit 101. For example, if the oscillating frequency of ring oscillator 103 is higher than a known threshold, then the process skew may be a fast skew. In another example, if the oscillating frequency of ring oscillator 103 is lower than another known threshold, the process may be a slow skew.

In one embodiment, thresholds are parameters which are determined during manufacturing of the integrated circuit 101 and indicate a skew, temperature, voltage condition above or below which integrated circuit 101 is considered to have a slow, typical, or fast process skew. In one embodiment, skew information is used by the PCU 102, in conjunction with first power supply 107 information, to determine the code for control signal 106 so that the size of sleep unit 104 is adjusted to dissipate the lowest leakage power.

Figure 2:
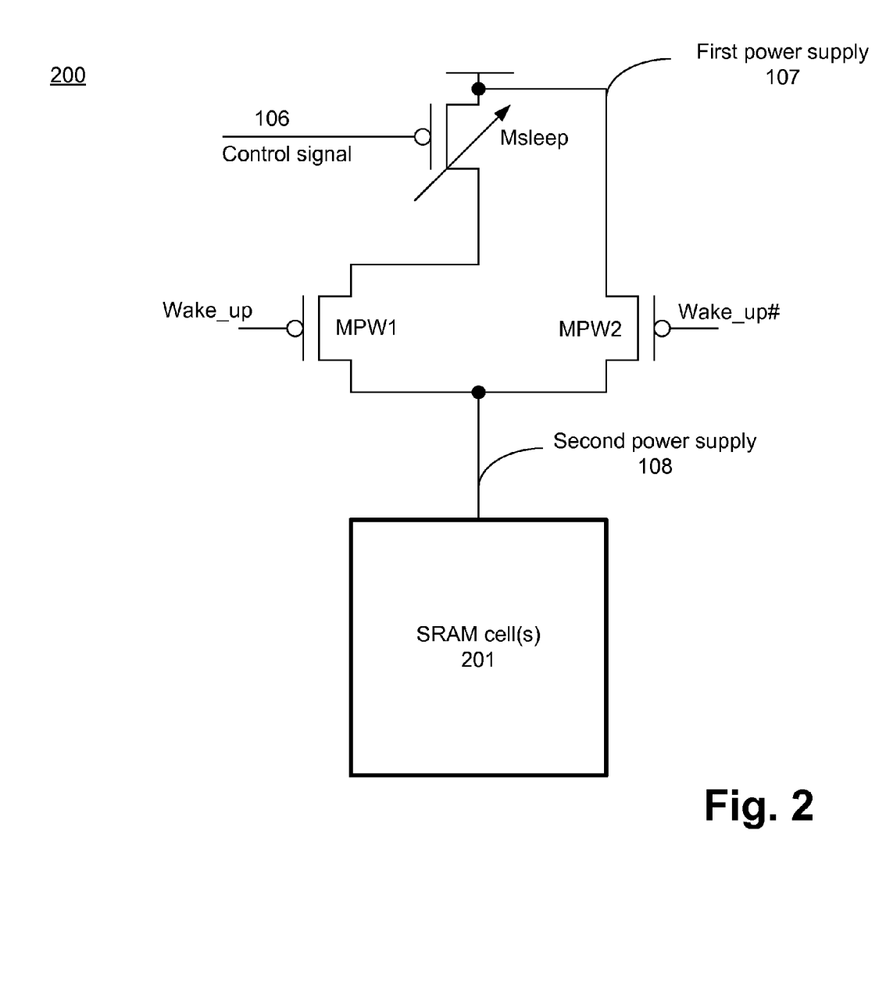
FIG. 2 is an apparatus to reduce leakage power of a memory cell, according to one embodiment of the disclosure.

FIG. 2 is an apparatus 200 to reduce leakage power of a memory cell, according to one embodiment of the disclosure. It is pointed out that those elements of FIG. 2 having the same reference numbers (or names) as the elements of any other figure can operate or function in any manner similar to that described, but are not limited to such.

In one embodiment, sleep unit 104 comprises sleep transistors Msleep with their source terminals coupled to first power supply 107 while their drain terminals coupled to second power supply 108. In one embodiment, sleep transistors Msleep are controlled by a digital control signal 106. For example, control signal 106 comprises a bus with 'N' bits for controlling gate terminals of the Msleep transistors. In one embodiment, Msleep transistors are binary weighted. In one embodiment, Msleep transistors are thermometer weighted. In another embodiment, other weighting techniques may be used for sizing the Msleep transistors.

In one embodiment, drain terminals of Msleep are coupled to a wake-up transistor MPW1 which in turn is coupled to second power supply 108 as shown. In one embodiment, another wake-up transistor MPW2 is coupled between second power supply 108 and first power supply 107 as shown. In one embodiment, MPW1 is controlled by wake-up signal while MPW2 is controlled by an inverse of the wake-up signal i.e., wake-up#.

In one embodiment, upon a read or write access to an array of SRAM cell(s), MPW2 is enabled (i.e., turned ON). In one embodiment, Msleep is never disabled, and size of Msleep is varied or modulated. When MPW2 is enabled, MPW1 is disabled (i.e., turned OFF) because MPW2 is controlled by wake-up# signal which is inverse of wake-up signal. In one embodiment, MPW2 restores full voltage across the SRAM cell(s) 201 and ensures that SRAM array read/write operations are not degraded.

In one embodiment, second power supply 108 is provided as power supply to the circuit of interest. In one embodiment, the circuit of interest includes SRAM cell(s) 201. In one embodiment, the effective size of Msleep is dynamically reduced during sleep mode which causes an increase in voltage drop across Msleep resulting in lowering second power supply 108. Lowering of second power supply 108 is translated to lower bit-cell leakage for the SRAM cell(s) 201.

The term "dynamically" generally refers to automatic change. For example, when level of first power supply 107 changes, PCU 102 monitors the change and in response to the monitored change selects a new code for control signal 106 resulting in a new effective size for Msleep.

Figure 3:
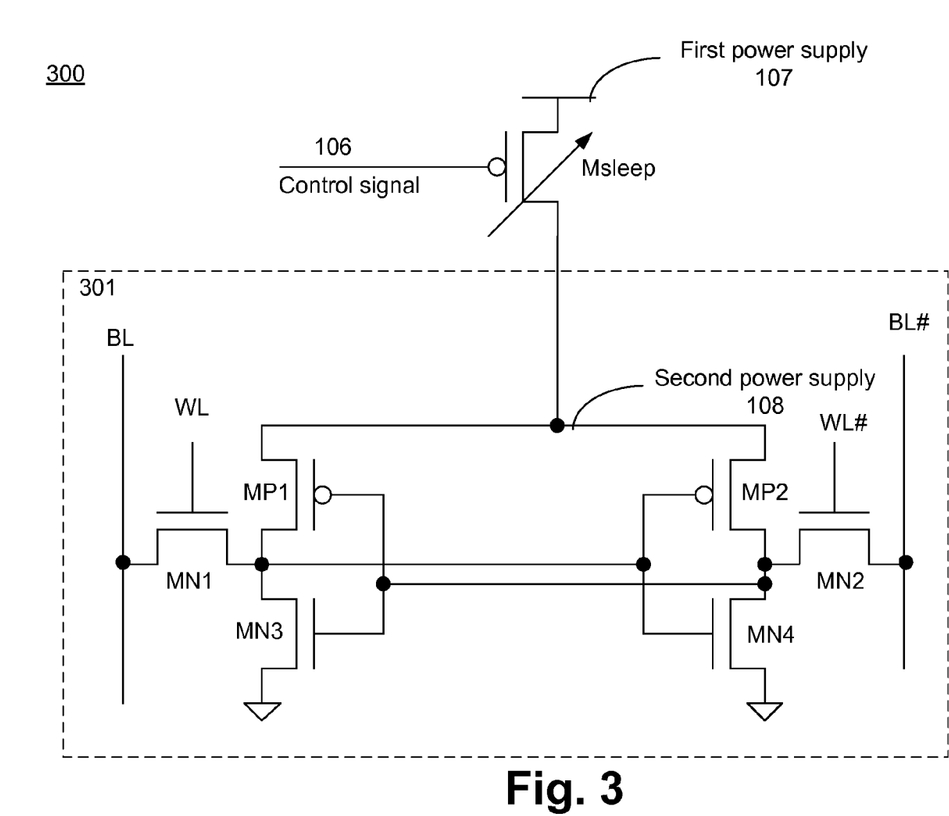
FIG. 3 is a transistor level view of a memory cell with an adjustable sleep transistor to reduce leakage power of the memory cell, according to one embodiment of the disclosure.

FIG. 3 is a transistor level view 300 of a memory cell 301 with an adjustable sleep transistor Msleep to reduce leakage power of the memory cell, according to one embodiment of the disclosure. It is pointed out that those elements of FIG. 3 having the same reference numbers (or names) as the elements of any other figure can operate or function in any manner similar to that described, but are not limited to such.

In one embodiment, memory 301 is a 6T (six transistor) SRAM memory cell comprising access transistors MN1 and MN2 controlled by word-line signals (WL and WL#), and cross-coupled inverters MP1, MN3 and MP2, MN4. In one embodiment, one terminal of the access transistors MN1 and MN2 are coupled to bit-line signals (BL and BL#). In one embodiment, source terminals of MP1 and MP2 are coupled to drain terminal of Msleep to receive second power supply 108. So as not to obscure the embodiments of the disclosure, a node and signal on the node are interchangeably used. For example, the term "second power supply 108" may be used to refer to node second power supply 108 or signal second power supply 108 depending on context of their usage.

In one embodiment, when first power supply 107 rises, second power supply 108 follows the rise pattern of first power supply 107. In such an embodiment, when first power supply 107 settles to a new high level, PCU 102 updates control signal 106 so that when integrated circuit 300 (and 301) enters sleep mode, the effective size of Msleep is selected so that the second power supply 108 is just above the retention supply level of the memory cell 301.

While the embodiment herein describes a 6T memory cell 301, other types of memory cells can be used. For example. 4T memory cell, 8T memory cell, latch, flip-flop, etc.

FIG. 4 is voltage band and size Table 400 to adjust sleep transistor size to reduce leakage power of the memory cell, according to one embodiment of the disclosure. In one embodiment, Table 400 resides in a non-volatile memory of the integrated circuit 101. Examples of non-volatile memory include flash memory, ROMs, PROMs (e.g., fuse), etc. In one embodiment, Table 400 is stored in a programmable memory and can be modified via fuse or operating system. In one embodiment, PCU 102 has access to Table 400. In one embodiment, PCU 102 is operable to modify contents of Table 400.

In one embodiment, Table 400 includes voltage band 401 corresponding to an effective sleep transistor size (Z) 402. In this example, there are five voltage bands (in mV) labeled A-E and corresponding five sleep transistor sizes (in μm) ZA-ZE. The example shows voltage band A (e.g., 650 mV to 700 mV) corresponding to an effective sleep transistor size ZA (e.g., 1.8 μm), voltage band B (e.g., 701 mV to 750 mV) corresponding to an effective sleep transistor size ZB (e.g., 1.0 μm), voltage band C (e.g., 751 mV to 800 mV) corresponding to an effective sleep transistor size ZC (e.g., 0.4 μm), voltage band D (e.g., 801 mV to 850 mV) corresponding to an effective sleep transistor size ZD (e.g., 0.3 μm), and voltage band E (e.g., 851 mV to 900 mV) corresponding to an effective sleep transistor size ZE (e.g., 0.2 μm). However, in other embodiments any number of voltage bands and corresponding transistor sizes may be used.

In one embodiment, PCU 102 compares first power supply 107 with voltage bands 401 and determines which voltage band covers voltage level of the first power supply 107. In one embodiment, PCU 102 monitors first power supply 107 to compare it with voltage bands 401 whenever first power supply 107 changes by a threshold amount (e.g., 50 mV). In one embodiment, PCU 102 periodically monitors first power supply 107 to compare it with voltage bands 401.

The term "periodically" generally refers to regular intervals of time. For example, monitoring first power supply 107 every 100 mS is periodically monitoring first power supply 107. In one embodiment, PCU 102 continuously monitors first power supply 107 to identify any change in the voltage level of first power supply 107 and to compare the voltage bands 401 whenever the first power supply 107 changes by a threshold amount (e.g., 50 mV) or to compare voltage bands 401 with the first power supply 107 periodically. The term "continuously" generally refers to an action performed without interruption. For example, monitoring first supply 107 all the time instead of monitoring first supply 107 after every fixed amount of time.

Once the appropriate voltage band is identified by PCU 102 by any method, the corresponding effective sleep transistor size is identified because for each voltage band there is a corresponding effective sleep transistor size. While Table 400 provides information above effective sleep transistor size in effective sleep transistor size may also be classified as the code for the digital control signal 106 which results in the effective sleep transistor size corresponding to the identified voltage band.

Figure 5:
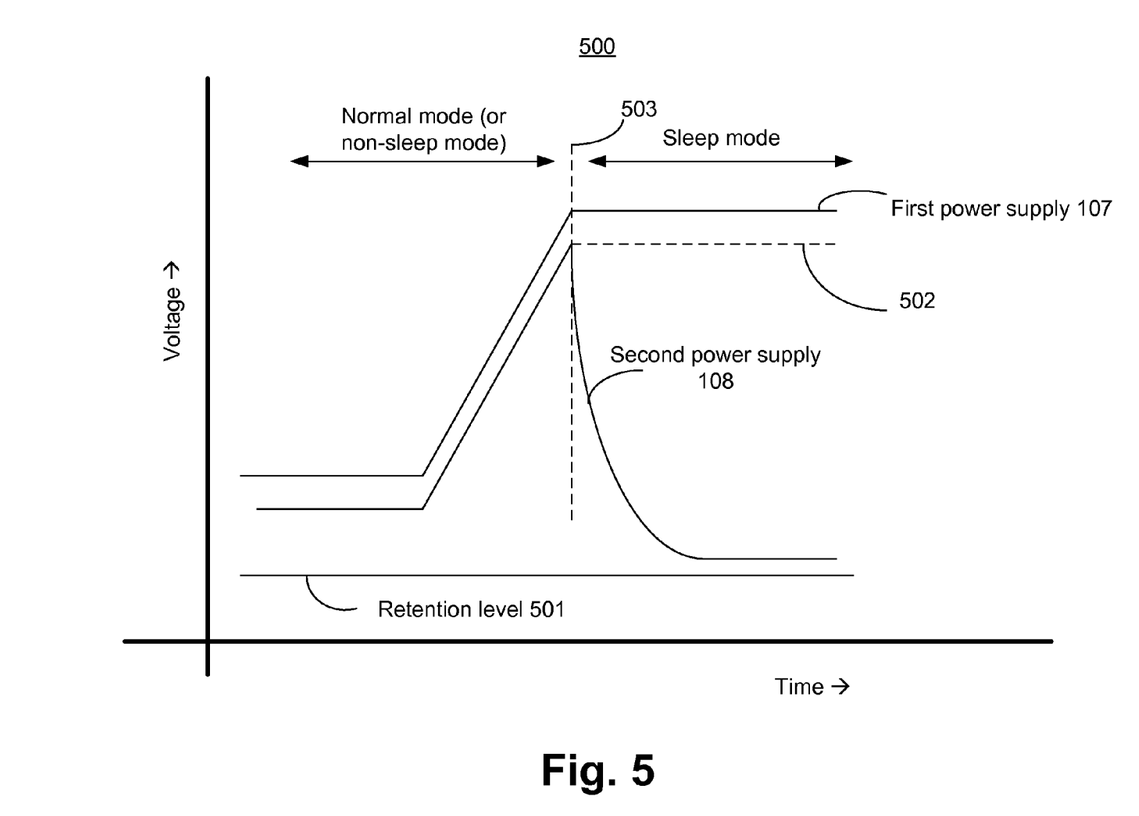
FIG. 5 is a plot which illustrates dynamic adjustment of a power supply level to the memory cell to reduce leakage power of the memory cell, according to one embodiment of the disclosure.

FIG. 5 is a plot 500 which illustrates dynamic adjustment of a power supply level to the memory cell to reduce leakage power of the memory cell, according to one embodiment of the disclosure. It is pointed out that those elements of FIG. 5 having the same reference numbers (or names) as the elements of any other figure can operate or function in any manner similar to that described, but are not limited to such.

The x-axis of plot 500 is time, while the y-axis is voltage. In this example, three waveforms are shown—retention level 501, second power supply 108 and its original trajectory 502, and first power supply 107. The first and second power supplies 107 and 108 are above retention supply level 501. As first power supply 107 rises (ramps up), second power supply 108 follows (or tracks) first power supply 107. The region to the left of 503 is the region of normal operation mode (or non-sleep mode, e.g., active mode) while the region to the right of 503 is the region of sleep mode (e.g., idle mode). In one embodiment, the non-sleep mode can also be one of the voltage bands.

In one embodiment, PCU 102 monitors first power supply 107 and compares it with voltage bands 401 of Table 400 and identifies the appropriate voltage band from the Table 400 and its corresponding effective sleep transistor size (e.g., in terms of code for control signal 106). In one embodiment, PCU 102 updates the code for control signal 106 to adjust the effective sleep transistor size so that when the processor or integrated circuit 101 enters sleep mode (region to the right of 503), second power supply 108 is lowered to be close to retention power supply level 501. In the absence of the described embodiments, second power supply 108 for typical architectures continues to follow first power supply 107 as illustrated by trajectory 502 resulting in higher leakage power consumption during sleep mode.

Figure 6:
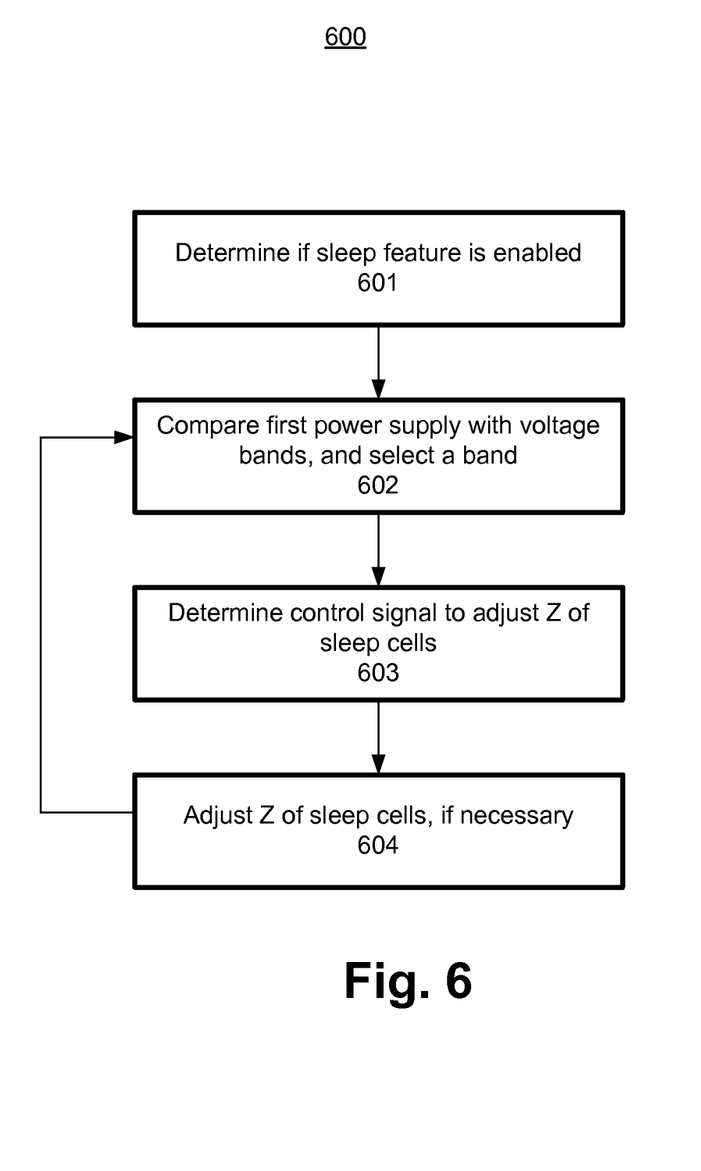
FIG. 6 is a flowchart performed by a power control unit (PCU) to reduce leakage power of the memory cell, according to one embodiment of the disclosure.

FIG. 6 is a flowchart 600 performed by PCU 102 to reduce leakage power of the memory cell, according to one embodiment of the disclosure. Although the blocks in the flowchart with reference to FIG. 6 are shown in a particular order, the order of the actions can be modified. Thus, the illustrated embodiments can be performed in a different order, and some actions/blocks may be performed in parallel. The flowchart of FIG. 6 is illustrated with reference to the embodiments of FIGS. 1-5. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 601, PCU 102 determines whether the feature of dynamically adjusting effective sleep transistor size during sleep mode is enabled. If PCU 102 determines that the feature is disabled, then the PCU 102 exits the flowchart 600. If PCU 102 determines that the feature of dynamically adjusting effective sleep transistor size during sleep mode is enabled, then the process proceeds to block 602.

At block 602, PCU 102 compares first power supply 107 with voltage bands 401 of Table 400 and selects the appropriate band according to the voltage level of first power supply 107. PCU 102 may use any of the methods discussed to select the appropriate voltage band. At block 603, PCU 102 determines the effective sleep transistor size (Z) 402 from Table 400 that corresponds to the voltage band selected during execution of block 602.

In one embodiment, the effective sleep transistor size (Z) corresponds to a code for control signal 106 that determines which sleep transistor to turn on/off to achieve the effective sleep transistor size. At block 604, PCU 102 provides the code for control signal 106 to adjust the effective sleep transistor size of the sleep unit 104 to substantially match with the effective sleep transistor size 402, which corresponds to the identified voltage band. As discussed herein, PCU 102 continuously, periodically, or based on a threshold, compares first power supply 107 with the voltage bands 402 of FIG. 4. This is indicated by the arrow from block 604 to block 602. The process 600 can be implemented in a finite state machine (FSM) or software executing on the PCU 102 or by the operating system.

Figure 7:
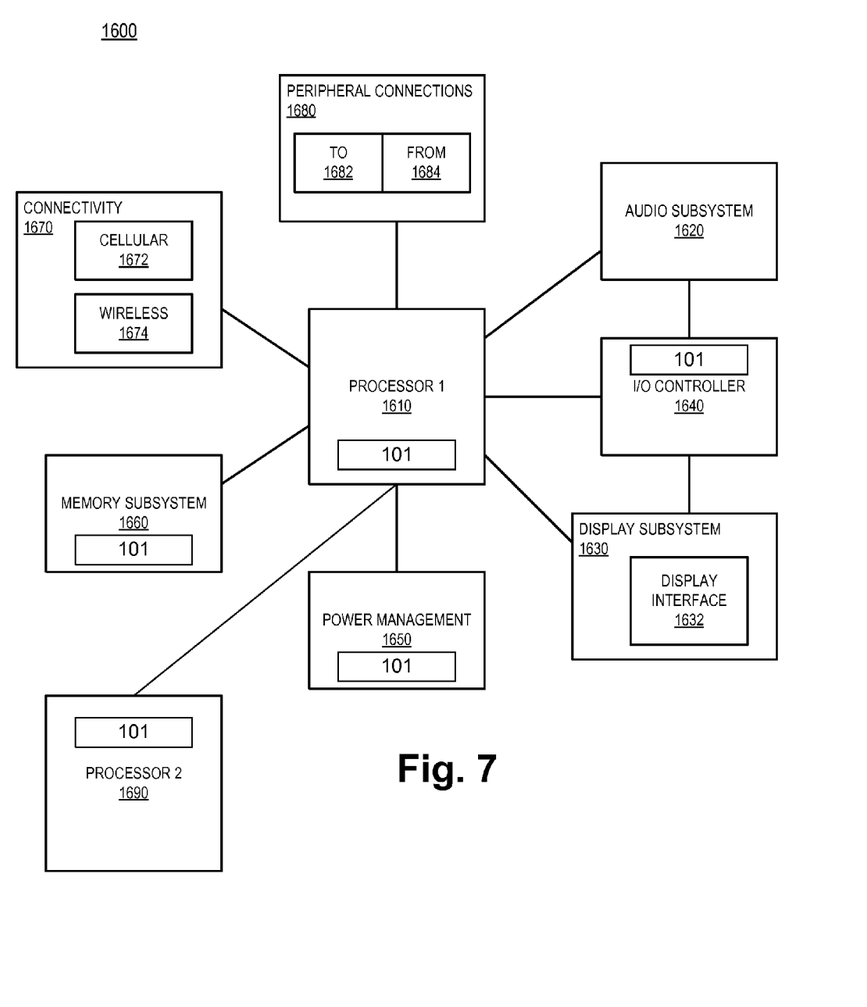
FIG. 7 is a smart device or a computer system with the apparatus to reduce leakage power, according to one embodiment of the disclosure.

FIG. 7 is a smart device 1600 or a computer system with the apparatus to reduce leakage power, according to one embodiment of the disclosure. It is pointed out that those elements of FIG. 7 having the same reference numbers (or names) as the elements of any other figure can operate or function in any manner similar to that described, but are not limited to such. FIG. 7 also illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in device 1600.

In one embodiment, computing device 1600 includes a first processor 1610 with the apparatus of integrated circuit 101, and a second processor 1690 with the apparatus of integrated circuit 101, according to the embodiments discussed herein. Other blocks of the computing device with I/O drivers may also include the apparatus of integrated circuit 101. The various embodiments of the present disclosure may also comprise a network interface within 1670 such as a wireless interface so that a system embodiment may be incorporated into a wireless device, for example, cell phone or personal digital assistant.

In one embodiment, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to device 1600 through which a user might interact with the system. For example, devices that can be attached to the computing device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on device 1600. Additionally, a docking connector can allow device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, the embodiments can be modified to operate with a n-type sleep unit i.e., Msleep is an n-type transistor. For example, the n-type Msleep transistor is coupled to the ground terminal of the SRAM cell. In such an embodiment, PCU 102 generates control signals 106 for the n-type Msleep transistor(s). The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented i.e., such specifics should be well within purview of one skilled in the art. Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, the apparatus comprises: a plurality of transistors operable to provide dynamically adjustable transistor size, the plurality of transistors coupled at one end to a first power supply and coupled at another end to a second power supply; a circuit coupled to the second power supply, the second power supply to provide power to the circuit; and a PCU to monitor the level of the first power supply, and to dynamically adjust the transistor size of the plurality of transistors so that second power supply is adjusted to keep the circuit operational.

In one embodiment, the plurality of transistors is p-type transistors. In one embodiment, the circuit is one of or part of: a SRAM; or a power-gating transistor. In one embodiment, the PCU is operable to monitor a frequency of a signal generated by a ring oscillator to determine process skew, the PCU to dynamically adjust the transistor size according to the determined process skew. In one embodiment, the first power supply has a voltage level higher than a voltage level of the second power supply. In one embodiment, the circuit is a sleep transistor of a static random access memory (SRAM).

In one embodiment, the PCU is operable to compare a level of the first power supply with a group of power supply bands associated with the circuit, wherein the group of power supply bands indicates a transistor size to be set for the plurality of transistors. In one embodiment, the PCU to define the group of power supply bands by monitoring a frequency of a signal generated by a ring oscillator. In one embodiment, the ring oscillator to determine process skew, and wherein the PCU to define the group of power supply bands for adjusting the transistor size according to the determined process skew.

In another example, a processor comprises: a sleep transistor coupled at one end to a first power supply and coupled at another end to a second power supply, the second power supply to provide power to a memory cell, the sleep transistor including a plurality of transistors operable to provide dynamically adjustable transistor size; and a PCU to monitor the level of the first power supply, and to dynamically adjust the transistor size of the plurality of transistors so that the second power supply is adjusted to retain data stored in the memory cell.

In one embodiment, the memory cell is a SRAM cell. In one embodiment, the first power supply has a voltage level higher than a voltage level of the second power supply. In one embodiment, the PCU is operable to monitor a frequency of a signal generated by a ring oscillator to determine process skew, the PCU to dynamically adjust the transistor size according to the determined process skew.

In one embodiment, the PCU is operable to compare a level of the first power supply with a group of power supply bands associated with a retention power supply level of the memory cell, and wherein the group of power supply bands indicates a transistor size to be set for the plurality of transistors. In one embodiment, the PCU to define the group of power supply bands by monitoring a frequency of a signal generated by a ring oscillator. In one embodiment, the ring oscillator to determine process skew, and wherein the PCU to define the group of power supply bands for adjusting the transistor size according to the determined process skew. In one embodiment, the PCU to dynamically adjust the transistor size of the plurality of transistors so that second power supply is adjusted above a retention power supply level for the memory cell.

In one embodiment, a system comprises: a memory; a processor, coupled to the memory, the processor according to any one of the apparatus or processor discussed herein; and a wireless interface for allowing the processor to communication with another device. In one embodiment, the system further comprises a display unit. In one embodiment, the memory cell is an SRAM cell.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a sleep transistor having a plurality of transistors operable to provide dynamically adjustable transistor size, at least some of the plurality of transistors are coupled at one end to a first power supply and coupled at another end to a second power supply;
a circuit coupled to the second power supply, the second power supply to provide power to the circuit; and
a power control unit (PCU) to monitor the level of the first power supply, and to dynamically adjust the transistor size of the sleep transistor having the at least some of the plurality of transistors such that the second power supply is substantially constant with reference to a retention supply level to keep the circuit operational during a low power state.

2. The apparatus of claim 1, wherein the plurality of transistors are p-type transistors.

3. The apparatus of claim 1, wherein the circuit is one of or part of:
a static random access memory (SRAM); or
a power-gating transistor.

4. The apparatus of claim 1, wherein the PCU is operable to monitor a frequency of a signal generated by a ring oscillator to determine process skew, the PCU to dynamically adjust the transistor size according to the determined process skew.

5. The apparatus of claim 1, wherein the first power supply has a voltage level higher than a voltage level of the second power supply.

6. The apparatus of claim 1, wherein the circuit is a sleep transistor of a static random access memory (SRAM).

7. The apparatus of claim 1, wherein the PCU is to compare a level of the first power supply with a group of power supply bands associated with the circuit, wherein the group of power supply bands indicating a transistor size is to be set for the at least some of the plurality of transistors.

8. The apparatus of claim 7, wherein the PCU is to define the group of power supply bands by monitoring a frequency of a signal generated by a ring oscillator.

9. The apparatus of claim 8, wherein the ring oscillator is to determine process skew, and wherein the PCU is to define the group of power supply bands for adjusting the transistor size according to the determined process skew.

10. A processor comprising:
a sleep transistor coupled at one end to a first power supply and coupled at another end to a second power supply, the second power supply is to provide power to a memory cell, the sleep transistor including a plurality of transistors operable to provide dynamically adjustable transistor size; and a power control unit (PCU) to monitor the level of the first power supply, and to dynamically adjust the transistor size of the sleep transistor having the plurality of transistors such that the second power supply is substantially constant with reference to a retention supply level to retain data stored in the memory cell during a low power state.

11. The processor of claim 10, wherein the memory cell is a static random access memory (SRAM).

12. The processor of claim 10, wherein the first power supply has a voltage level higher than a voltage level of the second power supply.

13. The processor of claim 10, wherein the PCU is operable to monitor a frequency of a signal generated by a ring oscillator to determine process skew, the PCU is to dynamically adjust the transistor size according to the determined process skew.

14. The processor of claim 10, wherein the PCU is to compare a level of the first power supply with a group of power supply bands associated with a retention power supply level of the memory cell, and wherein the group of power supply bands indicating a transistor size to be set for the plurality of transistors.

15. The processor of claim 14, wherein the PCU is to define the group of power supply bands by monitoring a frequency of a signal generated by a ring oscillator.

16. The apparatus of claim 15, wherein the ring oscillator is to determine process skew, and wherein the PCU is to define the group of power supply bands for adjusting the transistor size according to the determined process skew.

17. The processor of claim 10, wherein the PCU is to dynamically adjust the transistor size of the plurality of transistors so that second power supply is adjusted above a retention power supply level for the memory cell.

18. A system comprising:
a memory;
a processor, coupled to the memory, the processor including:
a sleep transistor coupled at one end to a first power supply and coupled at another end to a second power supply, the second power supply to provide power to a memory cell, the sleep transistor including a plurality of transistors operable to provide dynamically adjustable transistor size; and
a power control unit (PCU) to monitor the level of the first power supply, and to dynamically adjust the transistor size of the sleep transistor having the plurality of transistors so that second power supply is substantially constant with reference to a retention supply level to retain data stored in the memory cell during a low power state; and
a wireless interface for allowing the processor to communication with another device.

19. The system of claim 18 further comprises a display unit.

20. The system of claim 18, wherein the memory cell is a static random access memory (SRAM).

* * * * *